(12) United States Patent
Casucci et al.

(10) Patent No.: US 12,480,664 B2
(45) Date of Patent: Nov. 25, 2025

(54) COOKING APPLIANCE

(71) Applicant: WHIRLPOOL CORPORATION, Benton Harbor, MI (US)

(72) Inventors: Marco Casucci, Varese (IT); Anna D'Angelo, Novara (IT); Luca Distaso, Gemonio (IT); Alessandro Gigante, Varese (IT); Tushar A. Kalbande, Pune (IN); Simone Polvara, Bareggio (IT); Gaia Mannara, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 572 days.

(21) Appl. No.: 17/818,580

(22) Filed: Aug. 9, 2022

(65) Prior Publication Data
US 2024/0053028 A1  Feb. 15, 2024

(51) Int. Cl.
*F24C 15/16* (2006.01)
(52) U.S. Cl.
CPC .................................. *F24C 15/16* (2013.01)
(58) Field of Classification Search
CPC ........... F24C 15/16; F24C 15/02; F24C 15/18
USPC .......................................................... 126/1 R
See application file for complete search history.

(56) References Cited

U.S. PATENT DOCUMENTS

| 2,625,928 | A | | 1/1953 | Gould | |
|---|---|---|---|---|---|
| 4,149,518 | A | * | 4/1979 | Schmidt | F24C 15/162 126/41 D |
| 4,718,400 | A | | 1/1988 | Lotz et al. | |
| 4,780,597 | A | * | 10/1988 | Linhart | F24C 15/166 219/403 |
| 5,618,458 | A | * | 4/1997 | Thomas | F24C 3/124 219/403 |
| 6,847,020 | B2 | | 1/2005 | Yang et al. | |
| 8,803,045 | B2 | * | 8/2014 | Cadima | H05B 6/1236 99/324 |
| 8,883,234 | B2 | | 11/2014 | Choi | |
| 9,125,420 | B2 | | 9/2015 | Kwon et al. | |
| 9,826,744 | B2 | | 11/2017 | Kwon et al. | |
| 2005/0028805 | A1 | | 2/2005 | Bronstering et al. | |
| 2006/0081623 | A1 | | 4/2006 | Cho | |
| 2007/0133344 | A1 | * | 6/2007 | Bronstering | F24C 15/02 366/146 |
| 2016/0195281 | A1 | | 7/2016 | Chaturvedi et al. | |

FOREIGN PATENT DOCUMENTS

| BR | 102013026554 A2 | 9/2015 |
|---|---|---|
| DE | 8802992 U1 | 4/1988 |
| DE | 10234546 A1 | 7/2003 |
| DE | 102018121502 A1 | 3/2020 |

(Continued)

*Primary Examiner* — Avinash A Savani
(74) *Attorney, Agent, or Firm* — Price Heneveld LLP

(57) ABSTRACT

A cooking appliance includes a body that defines a cooking cavity, a door that defines a storage pocket, and a partition. The door is movable relative to the body between a closed position, wherein the door covers an opening to the cooking cavity, and an open position, wherein access to the cooking cavity is provided. The partition is operable between a stowed condition, wherein the partition is disposed within the storage pocket defined by the door, and the use condition, wherein the partition is positioned within the cooking cavity and divides the cooking cavity into a first sub-cavity and a second sub-cavity.

14 Claims, 5 Drawing Sheets

(56) References Cited

FOREIGN PATENT DOCUMENTS

| | | |
|---|---|---|
| DE | 202021103507 U1 | 8/2021 |
| EP | 2594158 A1 | 5/2013 |
| GB | 11172452 A | 12/1969 |

\* cited by examiner

COOKING APPLIANCE

BACKGROUND OF THE DISCLOSURE

The present disclosure generally relates to a cooking appliance. More specifically, the present disclosure relates to a cooking appliance that includes a partition that is operable between a stowed condition and a use condition.

SUMMARY OF THE DISCLOSURE

According to one aspect of the present disclosure, a cooking appliance includes a body that defines a cooking cavity, a door pivotably coupled to the body and operable to pivot between a closed position and an open position, and a partition operable between a stowed condition and a use condition. In the closed condition of the door, the door covers an opening to the cooking cavity. In the open position of the door, access to the cooking cavity is provided. In the stowed condition of the partition, the partition is coupled to the door such that the partition moves with the door between the closed and open positions. In the use condition of the partition, the partition is positioned within the cooking cavity and divides the cooking cavity into a first sub-cavity and a second sub-cavity.

According to another aspect of the present disclosure, a cooking appliance includes a body that defines a cooking cavity, a door that defines a storage pocket and is movable relative to the body between a closed position and an open position, and a partition operable between a stowed condition and a use condition. In the closed position of the door, the door covers an opening to the cooking cavity. In the open position of the door, access to the cooking cavity is provided. In the stowed condition of the partition, the partition is disposed within the storage pocket defined by the door. In the use condition of the partition, the partition is positioned within the cooking cavity and divides the cooking cavity into a first sub-cavity and a second sub-cavity.

According to yet another aspect of the present disclosure, a cooking appliance includes a body that defines a cooking cavity and a storage pocket, a door that is movable relative to the body between a closed position and an open position. In the closed position of the door, the door covers an opening to the cooking cavity. In the open position of the door, access to the cooking cavity is provided. The cooking appliance also includes a control panel that includes a plurality of input features configured to receive user inputs to control operation of the cooking appliance. The control panel is movable relative to the body between a first position and a second position. In the first position of the control panel, the control panel covers an opening to the storage pocket. In the second position of the control panel, access to the storage pocket is provided. The cooking appliance further includes a partition operable between a stowed condition and a use condition. In the stowed condition of the partition, the partition is disposed within the storage pocket defined by the body. In the use condition of the partition, the partition is positioned within the cooking cavity and divides the cooking cavity into a first sub-cavity and a second sub-cavity.

These and other features, advantages, and objects of the present disclosure will be further understood and appreciated by those skilled in the art by reference to the following specification, claims, and appended drawings.

Figure 1:
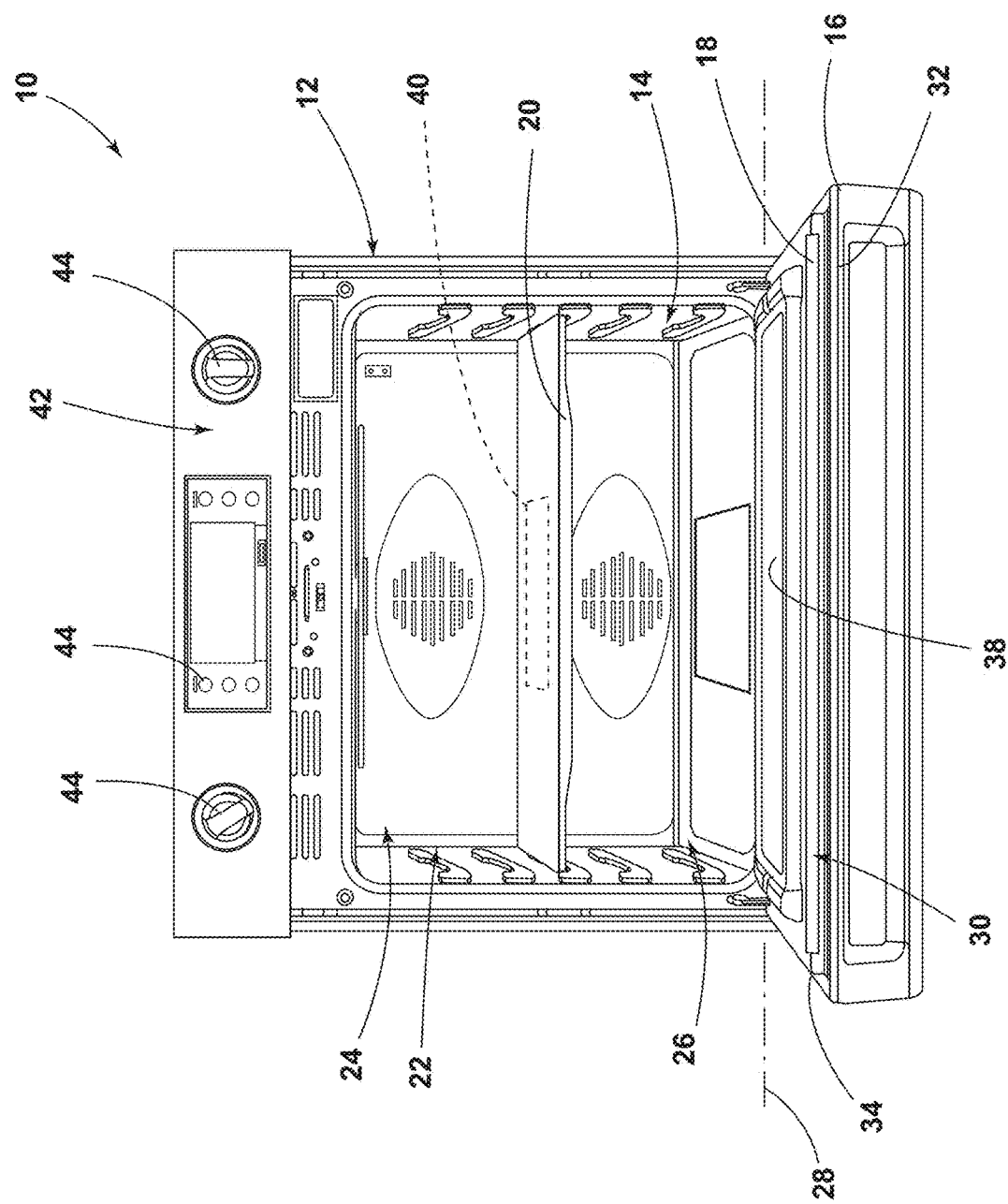
FIG. 1 is a front elevational view of a cooking appliance that includes a door in an open position and a partition that divides a cooking cavity of the cooking appliance into a first sub-cavity and a second sub-cavity in the use condition.

The components in the figures are not necessarily to scale, emphasis instead being placed upon illustrating the principles described herein.

DETAILED DESCRIPTION

The present illustrated embodiments reside primarily in combinations of apparatus components related to a cooking appliance. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-6, reference numeral 10 generally designates a cooking appliance 10. The cooking appliance 10 includes a body 12 that defines a cooking cavity 14, a door 16 that defines a storage pocket 18, and a partition 20. The door 16 is movable relative to the body 12 between a closed position, wherein the door 16 covers an opening 22 to the cooking cavity 14, and an open position, wherein access to the cooking cavity 14 is provided. The partition 20 is operable between a stowed condition, wherein the partition 20 is disposed within the storage pocket 18 defined by the door 16, and a use condition, wherein the partition 20 is positioned within the cooking cavity 14 and divides the cooking cavity 14 into a first sub-cavity 24 and a second sub-cavity 26.

Figure 2:
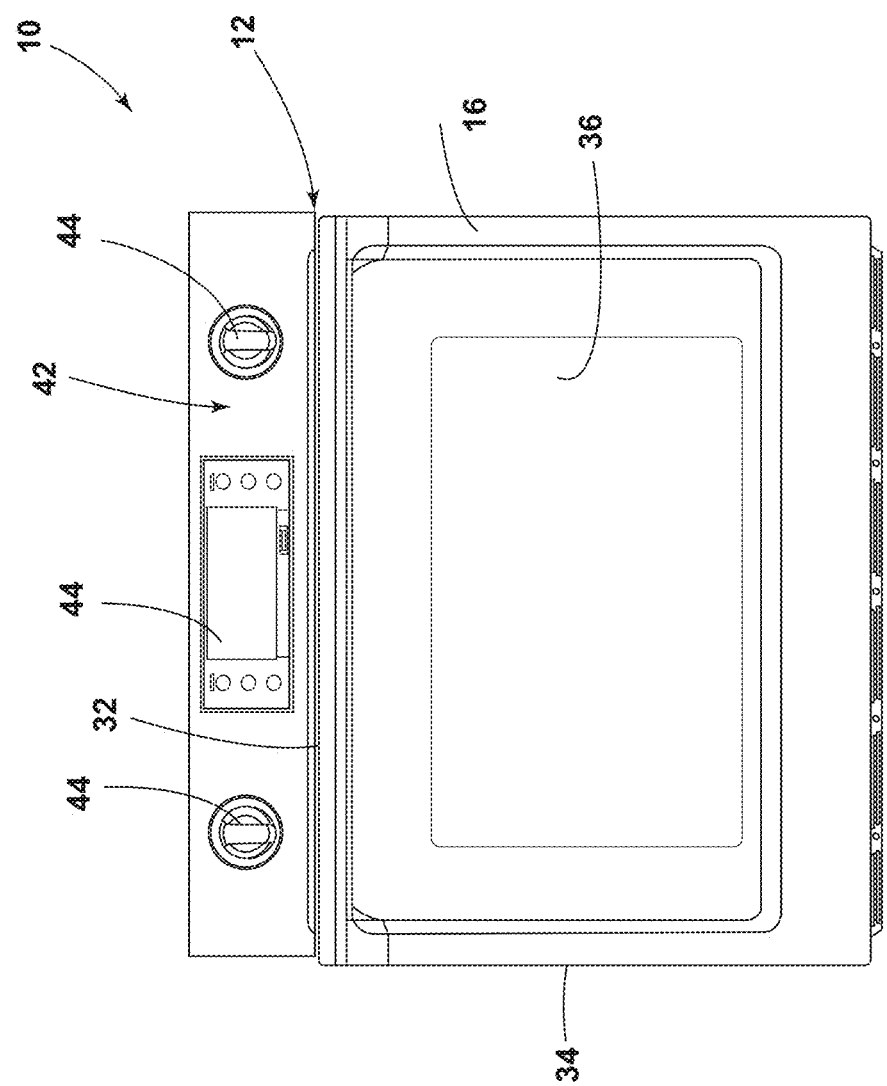
FIG. 2 is a front elevational view of a cooking appliance that includes a door in a closed position.
Figure 3:
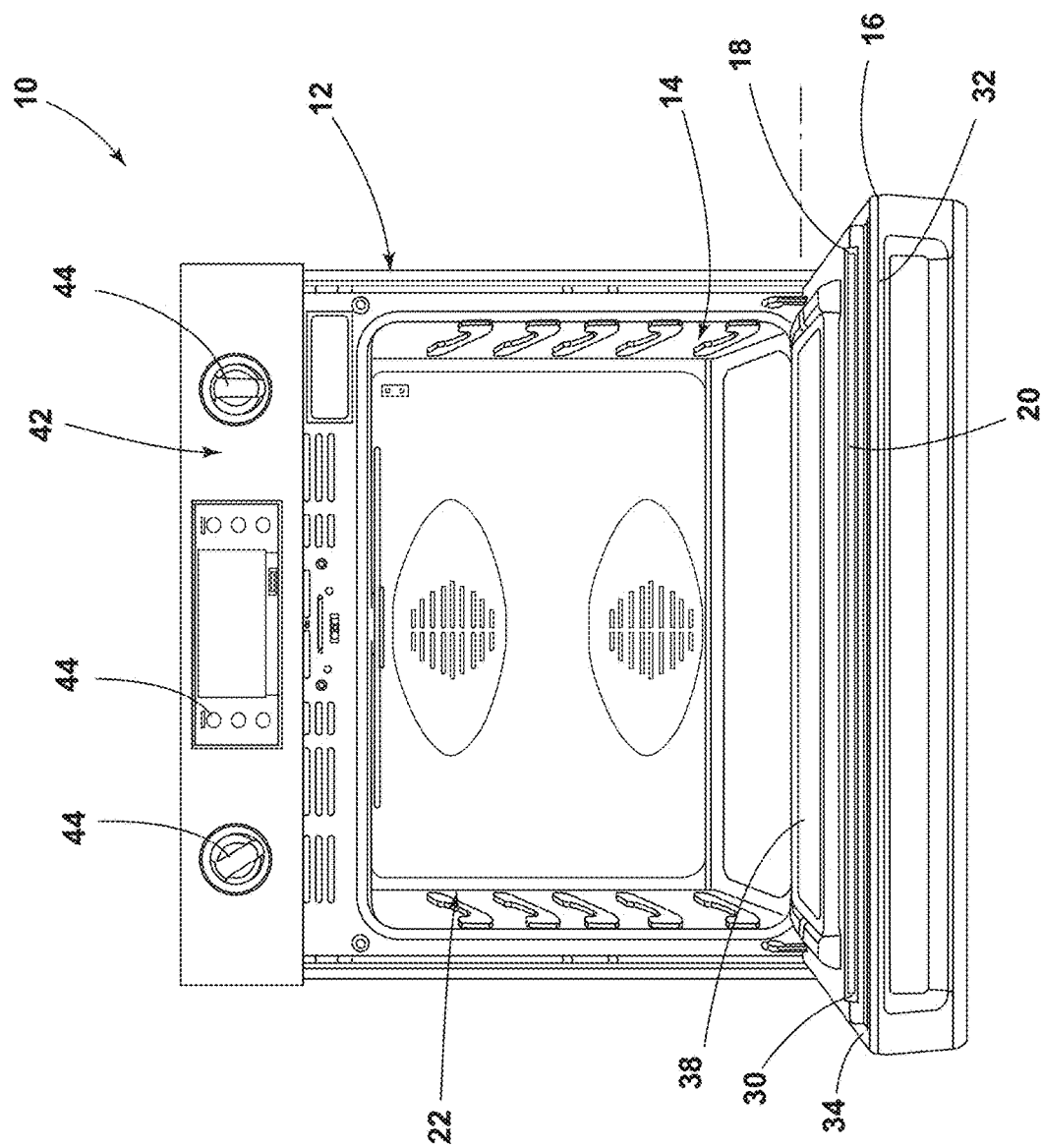
FIG. 3 is a front elevational view of a cooking appliance that includes a door in an open position and defining a storage pocket and a partition that is disposed within the storage pocket in a stowed condition.

Referring now to FIGS. 1-3, the cooking appliance 10 includes the body 12. As illustrated in FIGS. 1 and 3, the body 12 defines the cooking cavity 14. The cooking cavity 14 is configured to receive food items therein for cooking. In various implementations, the cooking cavity 14 is heated by a heating element (not shown) of the cooking appliance 10. A plurality of heating elements can heat the cooking cavity 14 in various implementations. Further, the cooking appliance 10 can include a variety of types of heating elements in various embodiments (e.g., gas, electric, etc.). In various embodiments, the body 12 is an assembly of a plurality of components of the cooking appliance 10.

The cooking appliance 10 includes the door 16, as illustrated in FIGS. 1-3. The door 16 is movable between the closed position, wherein the door 16 covers the opening 22 to the cooking cavity 14, as illustrated in FIG. 2, and the open position, wherein access to the cooking cavity 14 is provided, as illustrated in FIGS. 1 and 3. In some implementations, the door 16 is pivotably coupled to the body 12 and is operable to pivot between the closed position and the open position. As illustrated in FIGS. 1 and 2, the door 16 is operable to pivot about a pivot axis 28 between the open and closed positions. In the illustrated embodiment, the pivot axis 28 extends substantially horizontally; however, the pivot axis 28 can extend in a variety of directions (e.g., vertically) in various implementations. It is contemplated that the door 16 may move between the open and closed positions in a variety of manners, in various embodiments. For example, in an exemplary embodiment, the door 16 can translate outward from the body 12 to the open position to reveal the cooking cavity 14.

Referring now to FIGS. 1-4, the door 16 can define the storage pocket 18. As discussed further herein, the storage pocket 18 can be configured to receive the partition 20 of the cooking appliance 10 therein in the stowed condition of the partition 20. In the embodiment illustrated in FIG. 1, an opening 30 to the storage pocket 18 is defined by the door 16 distally from the pivot axis 28 about which the door 16 pivots between the open and closed positions. The storage pocket 18 extends generally toward the pivot axis 28 from the opening 30 to a bottom (not shown) of the storage pocket 18. In the illustrated embodiment, the opening 30 is positioned proximate to a top side 32 of the door 16 in the closed position of the door 16. It is contemplated that the opening 30 to the storage pocket 18 can be disposed in a variety of positions on the door 16. For example, in some implementations, the opening 30 to the storage pocket 18 may be defined proximate to a lateral side 34 of the door 16, such that the storage pocket 18 is configured to receive the partition 20 via sliding in a substantially horizontal direction.

Referring still to FIGS. 1-4, in the closed position of the door 16, the opening 30 to the storage pocket 18 can be at least one of covered and in fluid communication with the cooking cavity 14. For example, in some implementations, the body 12 of the cooking appliance 10 covers the opening 30 to the storage pocket 18 defined by the door 16 in the closed position of the door 16. In another example, the opening 30 to the storage pocket 18 defined by the door 16 is in fluid communication with the cooking cavity 14 in the closed position of the door 16. In various implementations, the opening 30 of the storage pocket 18 defined by the door 16 is separated from an exterior environment of the cooking appliance 10 by at least one of the door 16 and the body 12 of the cooking appliance 10.

Referring still to FIGS. 1-4, a portion of the door 16 can be transparent. As described further herein, in some implementations, a portion of the door 16 that defines the storage pocket 18 can be transparent. The transparent portion of the door 16 can allow a user to view the cooking cavity 14 defined by the body 12 in the closed position of the door 16.

Referring now to FIGS. 1-4, the cooking appliance 10 includes the partition 20. The partition 20 is configured to divide the cooking cavity 14 into the first sub-cavity 24 and the second sub-cavity 26. The partition 20 is operable between the stowed condition and the use condition. In some implementations, in the stowed condition, the partition 20 is coupled to the door 16 such that the partition 20 moves with the door 16 between the closed and open positions. In the use condition, the partition 20 is positioned within the cooking cavity 14 and divides the cooking cavity 14 into the first and second sub-cavities 24, 26, as illustrated in FIG. 1. In some implementations, the partition 20 is positioned within the storage pocket 18 defined by the door 16 in the stowed condition. For example, as illustrated in FIG. 3, the partition 20 is positioned within the storage pocket 18 defined by the door 16 in the stowed condition of the partition 20. It is contemplated that the partition 20 can be coupled to the door 16 in a variety of manners in the stowed condition of the partition 20.

Figure 4:
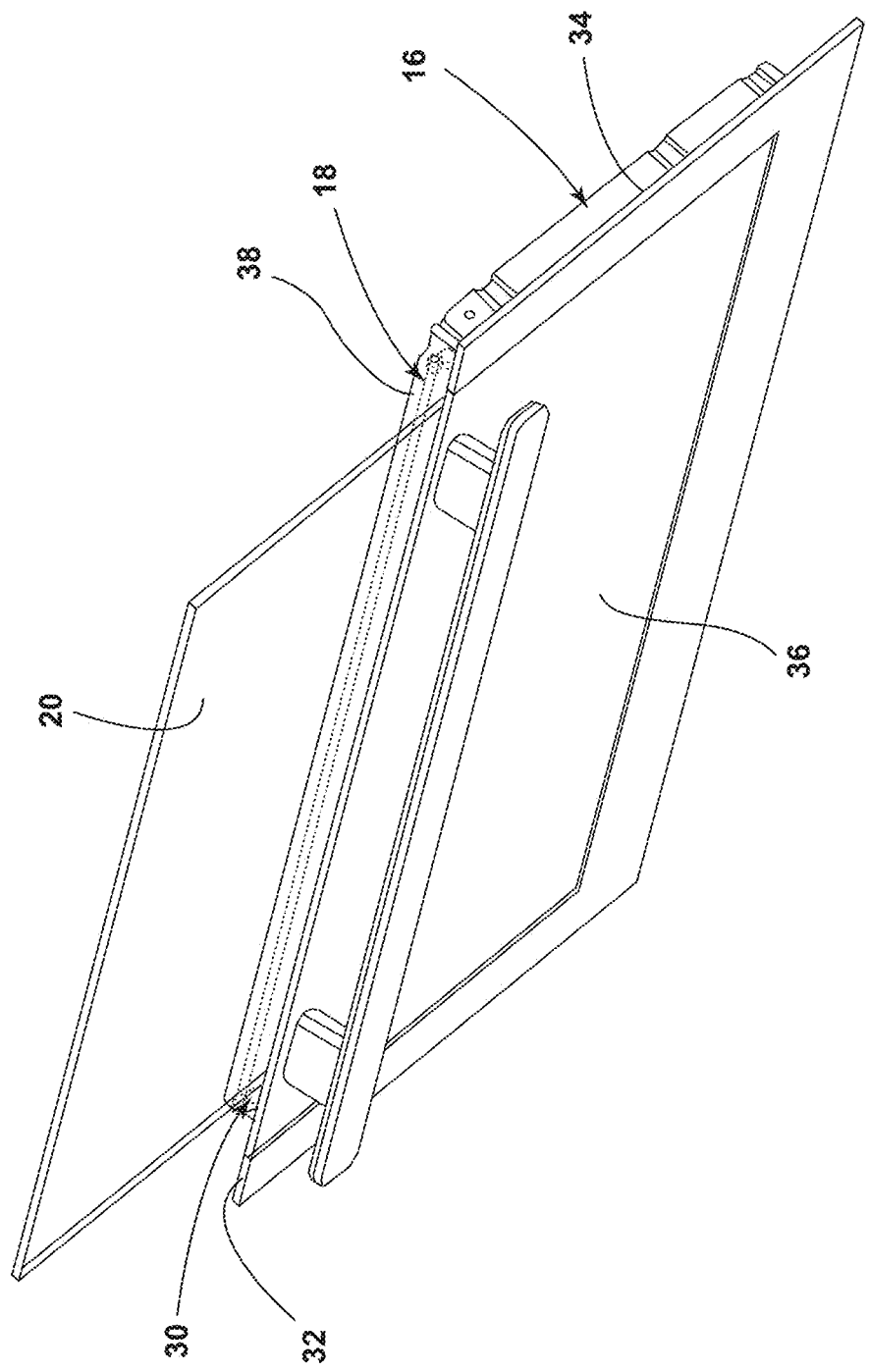
FIG. 4 is a top perspective view of a door of a cooking appliance that includes a storage pocket and a partition that is partially inserted into the storage pocket defined by the door.

As illustrated in FIG. 4, in some implementations, a portion of the partition 20 is transparent. In an exemplary embodiment, a portion of the door 16 is transparent and the transparent portion of the door 16 is aligned with the transparent portion of the partition 20 in the stowed condition of the partition 20, such that the cooking cavity 14 is viewable through the door 16 and the partition 20 in the closed position of the door 16 and the stowed condition of the partition 20. In the embodiment illustrated in FIG. 4, the door 16 includes a first transparent portion 36 that is configured to be in fluid communication with the exterior environment of the cooking appliance 10 in the closed position of the door 16, and a second transparent portion 38 that is configured to be in fluid communication with the cooking cavity 14 of the cooking appliance 10 in the closed position of the door 16. The first and second transparent portions 36, 38 of the door 16 define the storage pocket 18 of the door 16. As further illustrated in FIG. 4, the partition 20 that is shown partially inserted into the storage pocket 18 defined by the door 16 includes a transparent portion. The first and second transparent portions 36, 38 of the door 16 and the transparent portion of the partition 20 are aligned in the stowed condition of the partition 20 and the closed position of the door 16, such that the user may view the cooking cavity 14 of the cooking appliance 10 through the door 16 and the partition 20 in the closed position of the door 16 and the stowed condition of the partition 20. It is contemplated that the transparent portions of the door 16 and/or the partition 20 can be formed of one or more of a variety of transparent materials. In the embodiment illustrated in FIG. 4, the transparent portions of the door 16 and partition 20 are glass.

In some implementations, the partition 20 includes an auxiliary heating element 40. The auxiliary heating element 40 can be operable to heat at least one of the first sub-cavity 24 and the second sub-cavity 26 in the use condition of the partition 20. In operation of such an embodiment of the cooking appliance 10, the partition 20 divides the cooking cavity 14 into the first and second sub-cavities 24, 26 in the use condition of the partition 20, and the heating element of the cooking appliance 10 is configured to heat the second sub-cavity 26, which is positioned below the first sub-cavity 24. The partition 20 insulates the first sub-cavity 24 from the heating element of the cooking appliance 10, such that a temperature within the second sub-cavity 26 is different than a temperature within the first sub-cavity 24. The auxiliary heating element 40 of the partition 20 may be utilized to heat the first sub-cavity 24, which is positioned above the second sub-cavity 26, to a desired temperature for a first cooking setting, while the heating element of the cooking appliance 10 is utilized to heat the second sub-cavity 26 to a second cooking setting. As such, two different food items with different heat requirements can be cooked within the first and second sub-cavities 24, 26 of the cooking appliance 10, respectively, simultaneously.

Figure 6:
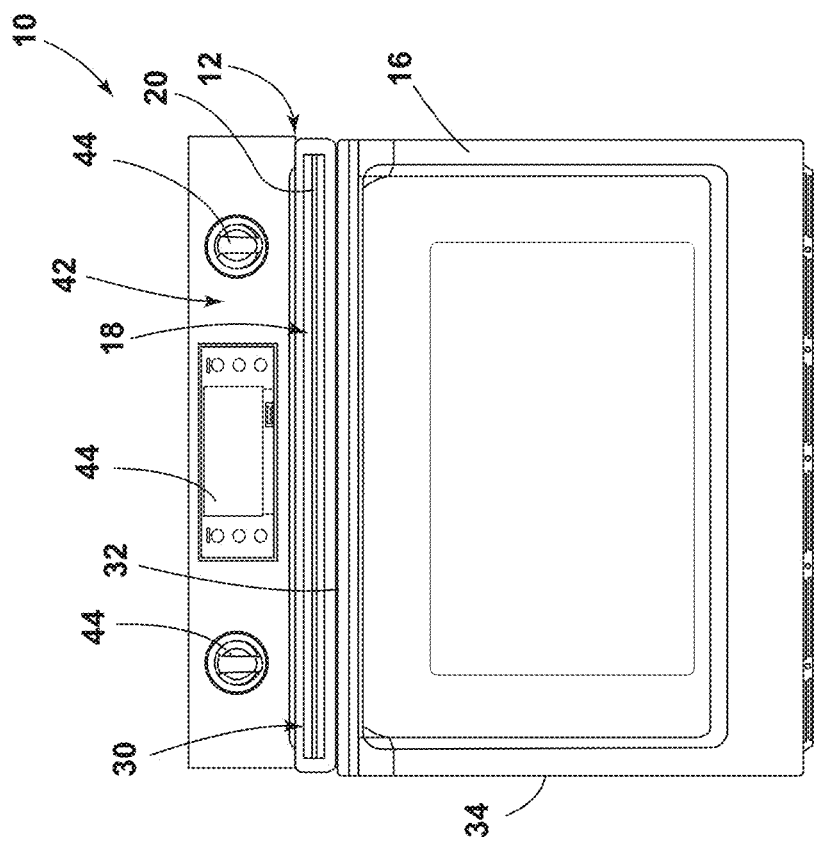
FIG. 6 is a front elevational view of a cooking appliance that includes the control panel in a second position and a storage pocket that is revealed when the control panel is in the second position.
Figure 5:
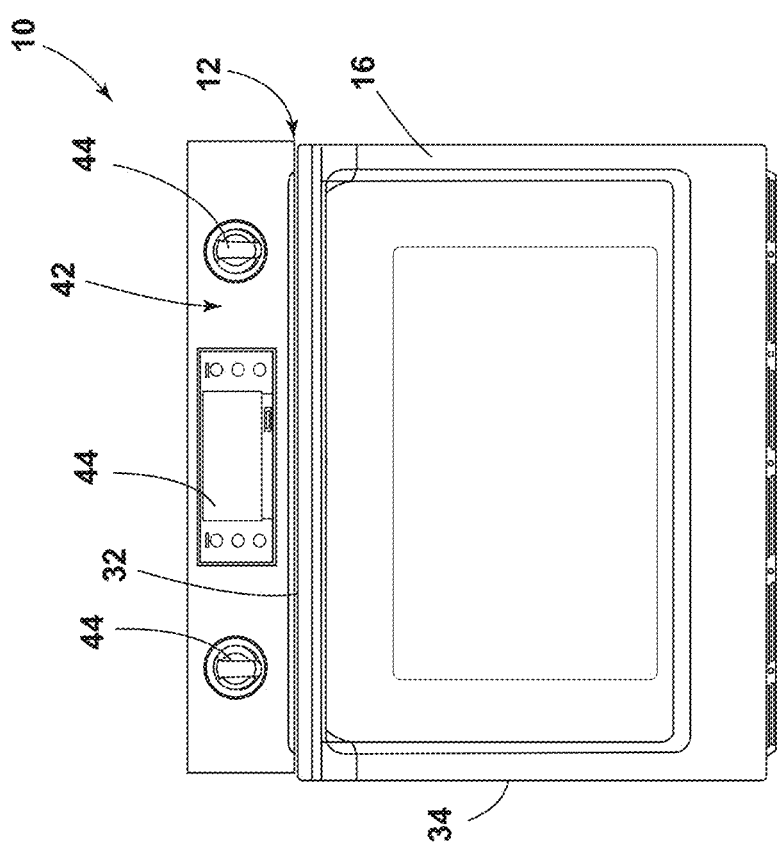
FIG. 5 is a front elevational view of a cooking appliance that includes a control panel in a first position.

Referring now to FIGS. 5 and 6, the cooking appliance 10 can include a control panel 42. The control panel 42 includes a plurality of input features 44 that are configured to receive user inputs to control operation of the cooking appliance 10. The control panel 42 can include a plurality of types of input features 44 (e.g., knobs, buttons, touchscreen inputs, etc.) that may receive user inputs to control a variety of types of cooking appliance operations (e.g., temperature, cook time, convection, etc.), in various implementations. In various implementations, the control panel 42 is movable relative to the body 12 between a first position and a second position. In the embodiment illustrated in FIGS. 5 and 6, the body 12 of the cooking appliance 10 defines the storage pocket 18 that is configured to receive the partition 20 in the stowed condition of the partition 20. As illustrated in FIGS. 5 and 6, in the first position of the control panel 42, illustrated in FIG. 5, the control panel 42 covers the opening 30 to the storage pocket 18. In the second position of the control panel 42, illustrated in FIG. 6, access to the storage pocket 18 defined by the body 12 is provided. In the illustrated embodiment, the storage pocket 18 is positioned upward of the door 16 and the cooking cavity 14, and the control panel 42 is configured to move upward from the first position to the second position to reveal the opening 30 to the storage pocket 18. It is contemplated that the storage pocket 18 may be positioned within the body 12 in a variety of positions relative to the door 16 and cooking cavity 14 of the cooking appliance 10 and, further, that the control panel 42 may move from the first position to the second position in a variety of directions and/or manners, in various implementations.

In operation of an exemplary embodiment of the cooking appliance 10, a user, desiring to cook two food items at two different temperatures within the cooking cavity 14, pivots the door 16 from the closed position to the open position to reveal the partition 20 disposed within the storage pocket 18 defined by the door 16. The user removes the partition 20 from the stowed condition and inserts the partition 20 into the cooking cavity 14 such that the partition 20 is in the use condition and defines the first and second sub-cavities 24, 26. Next, the user inserts the two food items into the first and second sub-cavities 24, 26, respectively, pivots the door 16 to the closed position and utilizes the input features 44 of the control panel 42 to heat the first and second sub-cavities 24, 26 as desired. After the first and second food items are cooked, the user pivots the door 16 to the open position, removes the partition 20 from the cooking cavity 14 and deposits the partition 20 into the storage pocket 18 defined by the door 16.

The cooking appliance 10 of the present disclosure can provide a variety of advantages. First, the storage pocket 18 defined by the door 16 provides a convenient place for stowing the partition 20 while the partition 20 is not in use. Second, the partition 20 and the door 16 having transparent portions that are aligned in the stowed condition of the partition 20 can advantageously allow a user to view the cooking cavity 14 while the door 16 is in the closed position and the partition 20 is in the stowed condition. Third, the control panel 42 being movable from the first position to the second position to reveal the storage pocket 18 defined by the body 12 provides a convenient solution for storing the partition 20 that does not impact the aesthetic of the cooking appliance 10.

According to one aspect of the present disclosure, a cooking appliance includes a body that defines a cooking cavity, a door pivotably coupled to the body and operable to pivot between a closed position and an open position, and a partition operable between a stowed condition and a use condition. In the closed condition of the door, the door covers an opening to the cooking cavity. In the open position of the door, access to the cooking cavity is provided. In the stowed condition of the partition, the partition is coupled to the door such that the partition moves with the door between the closed and open positions. In the use condition of the partition, the partition is positioned within the cooking cavity and divides the cooking cavity into a first sub-cavity and a second sub-cavity.

According to another aspect, the door defines a storage pocket, and the partition is positioned within the storage pocket in the stowed condition.

According to another aspect, a portion of the partition is transparent.

According to another aspect, a portion of the door is transparent, and the transparent portion of the door is aligned with the transparent portion of the partition in the stowed condition of the partition, such that the cooking cavity is viewable through the door and the partition in the closed position of the door.

According to another aspect, the partition includes a heating element that is operable to heat at least one of the first sub-cavity and the second sub-cavity in the use condition of the partition.

According to another aspect, the first sub-cavity is positioned above the second sub-cavity.

According to another aspect, in the closed position of the door, an opening to the storage pocket is at least one of covered and in fluid communication with the cooking cavity, and, in the open position of the door, access to the storage pocket is provided.

According to another aspect, an opening to the storage pocket is defined by the door distally from a pivot axis about which the door pivots between the open and closed positions, and the storage pocket extends generally toward the pivot axis from the opening.

According to another aspect of the present disclosure, a cooking appliance includes a body that defines a cooking cavity, a door that defines a storage pocket and is movable relative to the body between a closed position and an open position, and a partition operable between a stowed condition and a use condition. In the closed position of the door, the door covers an opening to the cooking cavity. In the open position of the door, access to the cooking cavity is provided. In the stowed condition of the partition, the partition is disposed within the storage pocket defined by the door. In the use condition of the partition, the partition is positioned within the cooking cavity and divides the cooking cavity into a first sub-cavity and a second sub-cavity.

According to another aspect, the door is operable to pivot relative to the body between the closed and open positions.

According to another aspect, a portion of the partition is transparent.

According to another aspect, a portion of the door that defines the storage pocket is transparent, and the transparent storage pocket-defining portion of the door is aligned with the transparent portion of the partition in the stowed condition of the partition, such that the cooking cavity is viewable through the door and the partition in the closed position of the door.

According to another aspect, the partition includes a heating element that is operable to heat at least one of the first sub-cavity and the second sub-cavity in the use condition of the partition.

According to another aspect, the first sub-cavity is positioned above the second sub-cavity.

According to another aspect, in the closed position of the door, an opening to the storage pocket is at least one of covered and in fluid communication with the cooking cavity, and, in the open position of the door, access to the storage pocket is provided.

According to another aspect, an opening to the storage pocket is defined by the door distally from a pivot axis about which the door pivots between the open and closed positions, and the storage pocket extends generally toward the pivot axis from the opening.

According to yet another aspect of the present disclosure, a cooking appliance includes a body that defines a cooking cavity and a storage pocket, a door that is movable relative to the body between a closed position and an open position. In the closed position of the door, the door covers an opening to the cooking cavity. In the open position of the door, access to the cooking cavity is provided. The cooking appliance also includes a control panel that includes a plurality of input features configured to receive user inputs to control operation of the cooking appliance. The control panel is movable relative to the body between a first position and a second position. In the first position of the control panel, the control panel covers an opening to the storage pocket. In the second position of the control panel, access to the storage pocket is provided. The cooking appliance further includes a partition operable between a stowed condition and a use condition. In the stowed condition of the partition, the partition is disposed within the storage pocket defined by the body. In the use condition of the partition, the partition is positioned within the cooking cavity and divides the cooking cavity into a first sub-cavity and a second sub-cavity.

According to another aspect, the storage pocket is positioned above the cooking cavity.

According to another aspect, the partition includes a heating element that is operable to heat at least one of the first sub-cavity and the second sub-cavity in the use condition of the partition.

According to another aspect, the first sub-cavity is positioned above the second sub-cavity.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a body that defines a cooking cavity;
   a door pivotably coupled to the body and operable to pivot between a closed position, wherein the door covers an opening to the cooking cavity, and an open position, wherein access to the cooking cavity is provided; and
   a partition operable between a stowed condition, wherein the partition is coupled to the door such that the partition moves with the door between the closed and open positions, and a use condition, wherein the partition is positioned within the cooking cavity and divides the cooking cavity into a first sub-cavity and a second sub-cavity, wherein a portion of the partition is transparent.

2. The cooking appliance of claim 1, wherein the door defines a storage pocket, and the partition is positioned within the storage pocket in the stowed condition.

3. The cooking appliance of claim 1, wherein a portion of the door is transparent, and wherein the transparent portion of the door is aligned with the transparent portion of the partition in the stowed condition of the partition, such that the cooking cavity is viewable through the door and the partition in the closed position of the door.

4. The cooking appliance of claim 1, wherein the partition includes a heating element that is operable to heat at least one of the first sub-cavity and the second sub-cavity in the use condition of the partition.

5. The cooking appliance of claim 1, wherein the first sub-cavity is positioned above the second sub-cavity.

6. The cooking appliance of claim 2, wherein, in the closed position of the door, an opening to the storage pocket is at least one of covered and in fluid communication with the cooking cavity, and wherein, in the open position of the door, access to the storage pocket is provided.

7. The cooking appliance of claim 2, wherein an opening to the storage pocket is defined by the door distally from a pivot axis about which the door pivots between the open and closed positions, and wherein the storage pocket extends generally toward the pivot axis from the opening.

8. A cooking appliance, comprising:
a body that defines a cooking cavity;
a door that defines a storage pocket and is movable relative to the body between a closed position, wherein the door covers an opening to the cooking cavity, and an open position, wherein access to the cooking cavity is provided; and
a partition operable between a stowed condition, wherein the partition is disposed within the storage pocket defined by the door, and a use condition, wherein the partition is positioned within the cooking cavity and divides the cooking cavity into a first sub-cavity and a second sub-cavity, wherein a portion of the partition is transparent.

9. The cooking appliance of claim 8, wherein the door is operable to pivot relative to the body between the closed and open positions.

10. The cooking appliance of claim 8, wherein a portion of the door that defines the storage pocket is transparent, and wherein the transparent storage pocket-defining portion of the door is aligned with the transparent portion of the partition in the stowed condition of the partition, such that the cooking cavity is viewable through the door and the partition in the closed position of the door.

11. The cooking appliance of claim 8, wherein the partition includes a heating element that is operable to heat at least one of the first sub-cavity and the second sub-cavity in the use condition of the partition.

12. The cooking appliance of claim 8, wherein the first sub-cavity is positioned above the second sub-cavity.

13. The cooking appliance of claim 8, wherein, in the closed position of the door, an opening to the storage pocket is at least one of covered and in fluid communication with the cooking cavity, and wherein, in the open position of the door, access to the storage pocket is provided.

14. The cooking appliance of claim 9, wherein an opening to the storage pocket is defined by the door distally from a pivot axis about which the door pivots between the open and closed positions, and wherein the storage pocket extends generally toward the pivot axis from the opening.

\* \* \* \* \*